United States Patent
Sobocinski (10) Patent No.: US 10,001,169 B2
(45) Date of Patent: Jun. 19, 2018

(54) PRONG TYPE CAGE FOR A DOUBLE ROW ROLLER BEARING ASSEMBLY

(71) Applicant: Schaeffler Technologies AG & Co. KG, Herzogenaurach (DE)

(72) Inventor: Dariusz Sobocinski, London (CA)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days. days.

(21) Appl. No.: 15/333,722

(22) Filed: Oct. 25, 2016

(65) Prior Publication Data
US 2018/0112714 A1    Apr. 26, 2018

(51) Int. Cl.
| F16C 33/46 | (2006.01) |
| F16C 19/28 | (2006.01) |
| F16C 33/48 | (2006.01) |
| F16C 33/49 | (2006.01) |

(52) U.S. Cl.
CPC ............ F16C 33/498 (2013.01); F16C 19/28 (2013.01); F16C 33/4676 (2013.01); F16C 33/48 (2013.01); F16C 33/495 (2013.01); F16C 2206/02 (2013.01); F16C 2208/04 (2013.01); F16C 2208/60 (2013.01); F16C 2240/44 (2013.01)

(58) Field of Classification Search
CPC .... F16C 19/28; F16C 33/4605; F16C 33/467; F16C 33/4682; F16C 33/4676; F16C 33/495; F16C 33/498; F16C 2208/04; F16C 2208/42; F16C 2208/60; F16C 2240/44; F16C 2240/70

USPC ....... 384/456, 470, 548, 551, 560, 564, 572, 384/576–577, 578, 580
See application file for complete search history.

(56) References Cited

U.S. PATENT DOCUMENTS

| 2,146,440 | A | * | 2/1939 | Pew | F16C 19/08 29/441.1 |
| 2,611,670 | A | * | 9/1952 | Palmgren | F16C 23/086 29/898.07 |
| 3,667,821 | A | | 6/1972 | Rader | |
| 4,004,840 | A | * | 1/1977 | Johnston | B60B 27/0005 384/526 |
| 4,278,307 | A | * | 7/1981 | Olschewski | F16C 33/416 384/526 |

(Continued)

FOREIGN PATENT DOCUMENTS

| DE | 102004043374 A1 | * | 3/2006 | ............ F16C 23/086 |
| DE | 102004043374 A1 | | 3/2006 | |

(Continued)

*Primary Examiner* — Marcus Charles
(74) *Attorney, Agent, or Firm* — Volpe and Koenig, P.C.

(57) ABSTRACT

A cage for a double row roller bearing assembly is disclosed. The cage includes an annular rim and two pluralities of webs. A first plurality of roller pockets are defined between adjacent ones of a first plurality of webs. Each of the webs of the first plurality of webs includes two first prongs and a first slot defined between the two first prongs. A first partial cylindrical guide surface is arranged on each first lateral surface of the first plurality of webs, and a first undercut is defined between each of the first lateral surfaces and the annular rim. Two adjacent ones of the first prongs are elastically deformable away from one another for insertion of a roller. A second plurality of webs are also provided with the same features as the first plurality of webs.

15 Claims, 10 Drawing Sheets

(56) References Cited

U.S. PATENT DOCUMENTS

| | | | |
|---|---|---|---|
| 4,623,270 A | 11/1986 | Olschewski et al. | |
| 5,033,878 A | 7/1991 | Tsuji et al. | |
| 5,295,749 A | 3/1994 | Takahashi et al. | |
| 5,582,483 A * | 12/1996 | Grunze | F16C 23/086 384/572 |
| 5,667,312 A * | 9/1997 | Grunze | F16C 23/086 384/450 |
| 6,474,874 B1 * | 11/2002 | Nogi | F16C 19/28 384/572 |
| 6,843,604 B2 * | 1/2005 | Hiramatsu | F16C 19/163 384/450 |
| 8,016,490 B2 * | 9/2011 | Hosoya | F16C 33/3818 384/450 |
| 8,821,026 B2 * | 9/2014 | Muller | F16C 19/28 384/572 |
| 9,273,726 B2 * | 3/2016 | Thunberg | F16C 33/425 |
| 2005/0069239 A1 * | 3/2005 | Yamamoto | F16C 19/28 384/572 |
| 2011/0229066 A1 * | 9/2011 | Muhamad | F16C 33/48 384/470 |
| 2013/0223785 A1 * | 8/2013 | Yamamoto | F16C 19/28 384/576 |
| 2014/0054102 A1 * | 2/2014 | Adane | F16C 33/3887 180/443 |

FOREIGN PATENT DOCUMENTS

| | | | |
|---|---|---|---|
| DE | 102010035061 A1 * | 2/2012 | F16C 19/28 |
| DE | 102014213634 A1 | 1/2016 | |
| EP | 2787224 A2 * | 10/2014 | F16C 33/4682 |
| EP | 2787231 A2 * | 10/2014 | F16C 33/467 |
| EP | 2787232 A2 * | 10/2014 | F16C 33/6614 |
| EP | 2952760 A2 * | 12/2015 | F16C 33/4676 |
| JP | 2007303608 A * | 11/2007 | F16C 33/48 |
| JP | 2017078480 A * | 4/2017 | |

* cited by examiner

PRONG TYPE CAGE FOR A DOUBLE ROW ROLLER BEARING ASSEMBLY

FIELD OF INVENTION

The present invention relates to a bearing cage and is more particularly related to a double row roller bearing cage.

BACKGROUND

Bearing cages, also referred to as retainers or separators, are used in many bearing assemblies for separating, maintaining symmetrical circumferential spacing, and guiding rollers. Bearings used in aerospace applications require very durable, strong cages to withstand extreme operating conditions, such as high temperatures and fast rotating speeds. The cage must also be lightweight because weight is a critical design consideration in aerospace applications. Some known bearing cages for aerospace applications are segmented or joined types, however these types of cages require increased space compared to single-piece cages. Other bearing cages include complex interlocking or segmented halves, which are complicated to produce and assemble, as well as being too unreliable for an aerospace application.

It would be desirable to provide an improved bearing cage that is both simple to produce and assemble, as well as being durable and lightweight.

SUMMARY

An improved cage for a bearing assembly used in aerospace applications is disclosed. The cage includes an annular rim and first and second pluralities of webs. The first plurality of webs extends axially from a first axial side of the annular rim. A first plurality of roller pockets are defined by the cage that surround, position, and retain rollers. Adjacent ones of the first plurality of webs define the first plurality of roller pockets. Each of the webs of the first plurality of webs includes two first prongs and a first slot defined between the two first prongs. A first partial cylindrical guide surface is arranged on each first lateral surface of the first plurality of webs, and a first undercut is defined between each of the first lateral surfaces and the annular rim. Two of the first prongs on adjacent ones of the first plurality of webs that define one of the first plurality of roller pockets are elastically deformable away from one another for insertion of a roller. The second plurality of webs extends axially from a second axial side of the annular rim. A second plurality of roller pockets are defined between adjacent ones of the second plurality of webs. Each of the webs of the second plurality of webs includes two second prongs and a second slot defined between the two second prongs. A second partial cylindrical guide surface is arranged on each second lateral surface of the second plurality of webs. A second undercut is defined between each of the second lateral surfaces and the annular rim. Two of the second prongs on adjacent ones of the second plurality of webs that define one of the second plurality of roller pockets are elastically deformable away from one another for insertion of a roller.

In another embodiment, a double row roller assembly is provided that includes the cage discussed above. The double row roller bearing assembly includes an inner ring defining a first inner raceway formed as a circumferential groove, and a second inner raceway formed as a circumferential groove, and an outer ring defining a first outer raceway and a second outer raceway. The first outer raceway and the second outer raceway are formed on a single, common surface of the outer ring. A first plurality of rollers run on the first inner raceway and the first outer raceway, and a second plurality of rollers run on the second inner raceway and the second outer raceway. The first and second pluralities of rollers are arranged respectively within the first plurality of roller pockets and the second plurality of roller pockets of the cage in the assembled bearing. The two first prongs of each of the first plurality of webs are circumferentially deflected towards one another by adjacent ones of the first plurality of rollers during assembly of the rollers in the roller pockets, and the two second prongs of each of the second plurality of webs are circumferentially deflected towards one another by adjacent ones of the second plurality of rollers.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Certain terminology is used in the following description for convenience only and is not limiting. The words "front," "rear," "upper," and "lower" designate directions in the drawings to which reference is made. The words "inwardly" and "outwardly" refer to directions toward and away from the parts referenced in the drawings. "Axially" refers to a direction along the axis of a shaft or rotating part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
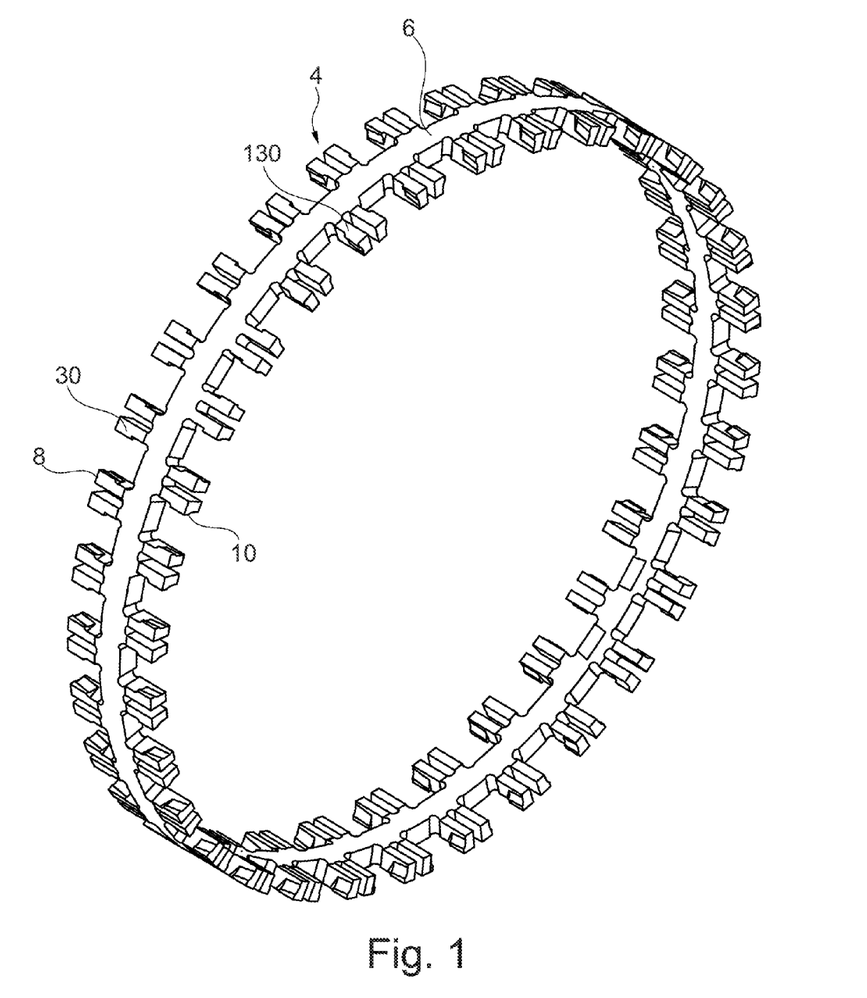
FIG. 1 is perspective view of a cage for a double row roller bearing assembly according to a first embodiment.
Figure 2:
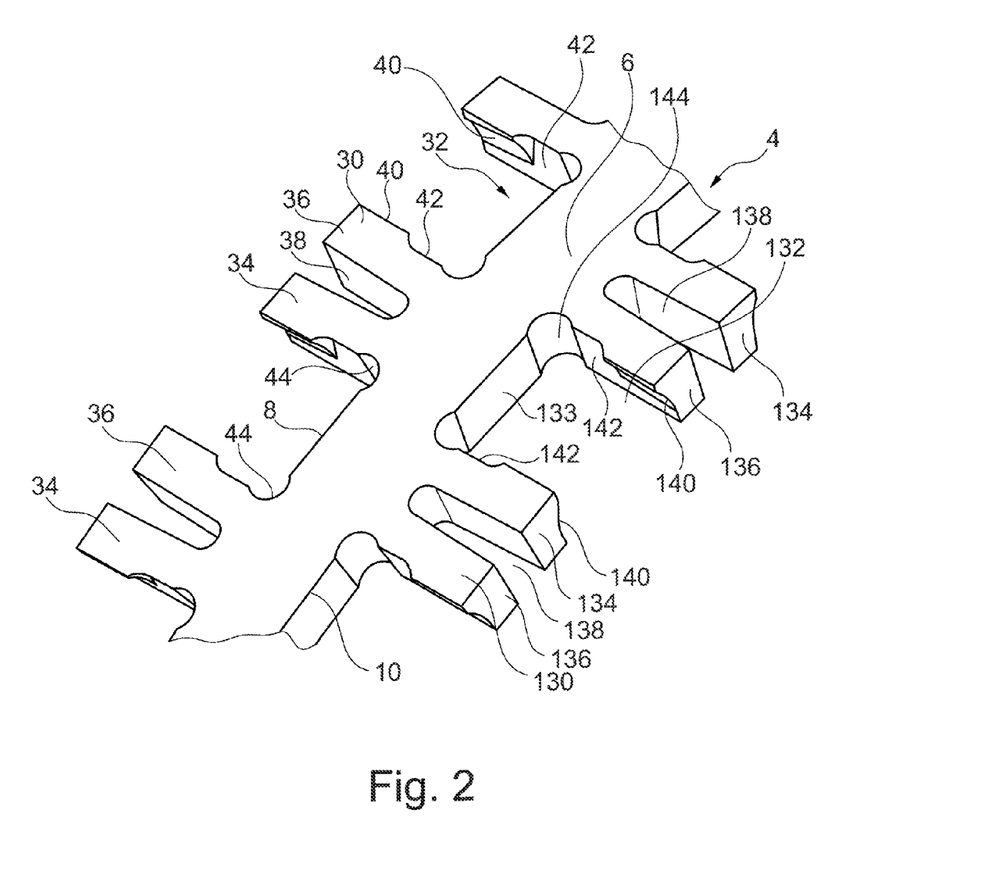
FIG. 2 is a magnified view of a portion of the cage of FIG. 1.

Referring to FIGS. 1-7B, a cage 4 for a double row roller bearing assembly 2, as shown in FIG. 2, is provided. The cage 4 is used primarily in aerospace applications, which experience relatively higher temperatures and rotational speeds than typical bearing applications. The cage 4 includes an annular rim 6 including a first plurality of webs 30 extending from a first axial side 8 and a second plurality of webs 130 extending from a second axial side 10. In one embodiment, the cage 4 is formed from a glass-filled thermoplastic, such as polyetheretherketone (PEEK), carbon fiber, or polyamide-imide. In one embodiment, the cage 4 is formed from Torlon®. The material of the cage 4 is selected to ensure that the cage 4 is sufficiently durable to withstand the high temperatures, e.g. 120° C.-140° C., experienced in aerospace applications.

As shown most clearly in FIG. 2, the first plurality of webs 30 extend axially from the first axial side 8 of the annular rim 6 and the second plurality of webs 130 extend axially from the second axial side 10 of the annular rim 6. A first plurality of roller pockets 32 is defined between adjacent ones of the first plurality of webs 30. Each of the webs of the first plurality of webs 30 includes two first prongs 34, 36 and a first slot 38 defined between the two first prongs 34, 36. A first partial cylindrical guide surface 40 is arranged on each first lateral surface 42 of the first plurality of webs 30. A first undercut 44 is defined between each of the first lateral surfaces 42 and the annular rim 6. Two of the first prongs 34, 36 on adjacent ones of the first plurality of webs 30 define one of the first plurality of roller pockets 32 and are elastically deformable away from one another for insertion of a roller 12, shown in FIGS. 4-7B. The first plurality of partial cylindrical guide surfaces 40 are spaced away from the first plurality of undercuts 44.

The second plurality of webs 130 preferably have an identical configuration and structure as the first plurality of webs 30, although this could be varied if different sized rollers are to be used. A second plurality of roller pockets 132 is defined between adjacent ones of the second plurality of webs 130. Each of the webs of the second plurality of webs 130 includes two second prongs 134, 136 and a second slot 138 defined between the two second prongs 134, 136. A second partial cylindrical guide surface 140 is arranged on each second lateral surface 142 of the second plurality of webs 130. A second undercut 144 is defined between each of the second lateral surfaces 142 and the annular rim 6. Two of the second prongs 134, 136 on adjacent ones of the second plurality of webs 130 that define one of the second plurality of roller pockets 132 are elastically deformable away from one another for insertion of a roller 12. The second plurality of partial cylindrical guide surfaces 140 are spaced away from the second plurality of undercuts 144. The undercuts 44, 144 minimize stress concentrations at a base of the webs 30, 130 as the rollers 12 are inserted and the webs 30, 130 undergo deflection.

The first plurality of webs 30 and the second plurality of webs 130 are circumferentially offset from each other. In one embodiment, the first plurality of webs 30 and the second plurality of webs 130 are circumferentially offset from each other by half of a pitch of the first plurality of roller pockets 32 and the second plurality of roller pockets 132. This is shown, for example, in FIG. 2, where the first slot 38 is shown circumferentially aligned with a mid-point 133 of an adjacent one of the second plurality of roller pockets 132. The first plurality of partial cylindrical guide surfaces 40 and the second plurality of partial cylindrical guide surfaces 140 each are spaced away from the annular rim 6.

Figure 4:
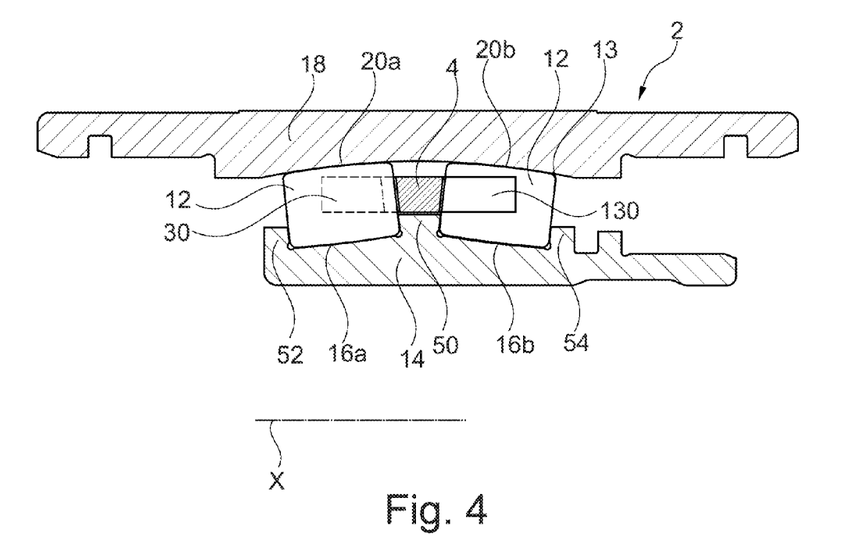
FIG. 4 is another side cross section view of a double row roller bearing assembly including the cage of FIGS. 1-3B.
Figure 5:
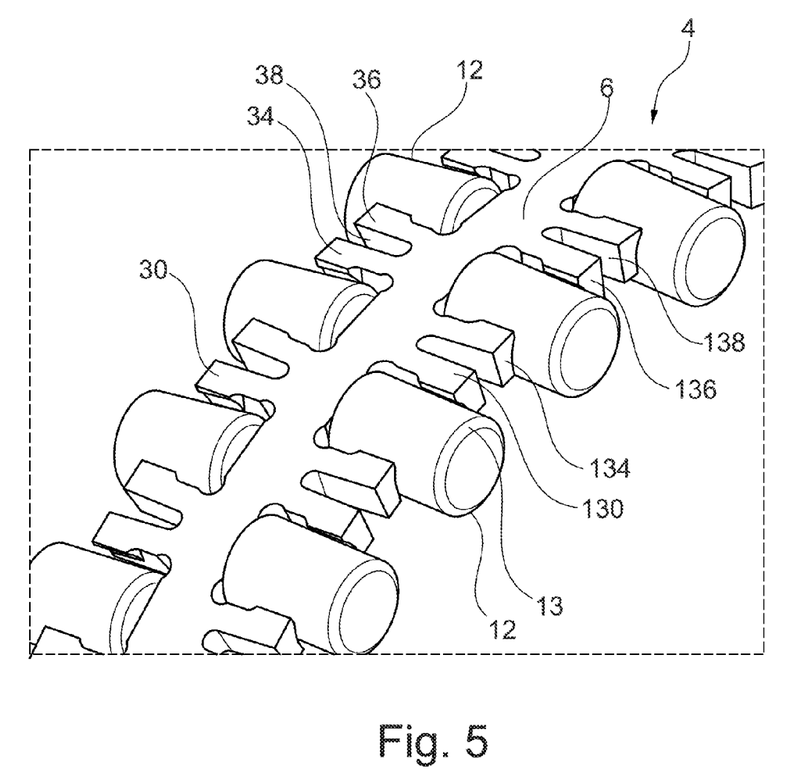
FIG. 5 is a magnified perspective view of the cage and rollers of the double row roller bearing assembly of FIG. 4.

In one embodiment shown in FIG. 4, the double row roller bearing assembly 2 includes the cage 4, an inner ring 14 defining a first inner raceway 16a and a second inner raceway 16b, and an outer ring 18 defining a first outer raceway 20a and a second outer raceway 20b. As shown in the Figures, the outer ring 18 defines both of the first outer raceway 20a and the second outer raceway 20b on a single, common, and continuous surface. A first plurality of rollers 12 are supported to run on the first inner raceway 16a and the first outer raceway 20a, and a second plurality of rollers 12 are supported to run on the second inner raceway 16b and the second outer raceway 20b.

The first and second pluralities of rollers 12 are arranged respectively within the first plurality of roller pockets 32 and the second plurality of roller pockets 132 of the cage 4 in the assembled bearing. The first and second pluralities of rollers 12 are cylindrical rollers with curved axial ends 13. The shape of the rollers 12 can be varied depending on a particular application. Each of the first plurality of rollers 12 are arranged within a respective one of the first plurality of roller pockets 32, and each of the second plurality of rollers 12 are arranged within a respective one of the second plurality of roller pockets 132 in the assembled bearing such that the two first prongs 34, 36 of each of the first plurality of webs 30 are circumferentially deflected towards one another by rollers 12 in adjacent pockets 32 and the two second prongs 134, 136 of each of the second plurality of webs 130 are circumferentially deflected towards one another by rollers 12 in adjacent pockets 132.

As shown in FIG. 4, in one embodiment, the inner ring 14 includes a central rib 50 arranged axially between the first inner raceway 16a and the second inner raceway 16b. The inner ring 14 also includes a first shoulder 52 arranged on an axial opposite side of the first inner raceway 16a from the central rib 50, and a second shoulder 54 arranged on an axial opposite side of the second inner raceway 16b from the central rib 50. The plurality of rollers 12 are axially constrained between the central rib 50 and first shoulder 52, and between the central rib 50 and the second shoulder 54. The central rib 50, the first shoulder 52, and the second shoulder 54 prevent tilting of the rollers 12, control skewing, reduce vibrations and component wear, and help to prevent premature failure of the double row roller bearing assembly 2.

Figure 3A:
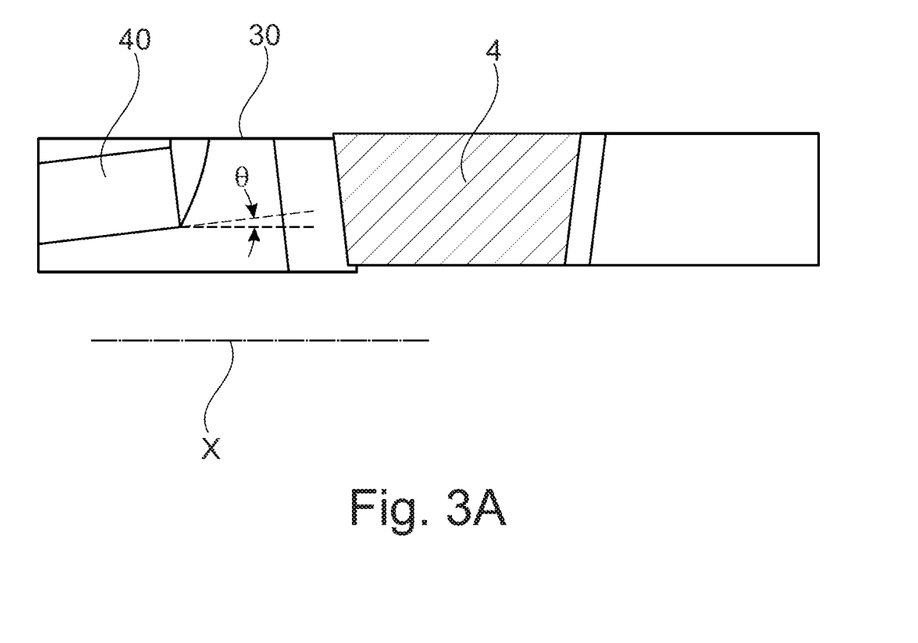
FIG. 3A is a side cross section view of the cage of FIGS. 1 and 2.
Figure 3B:
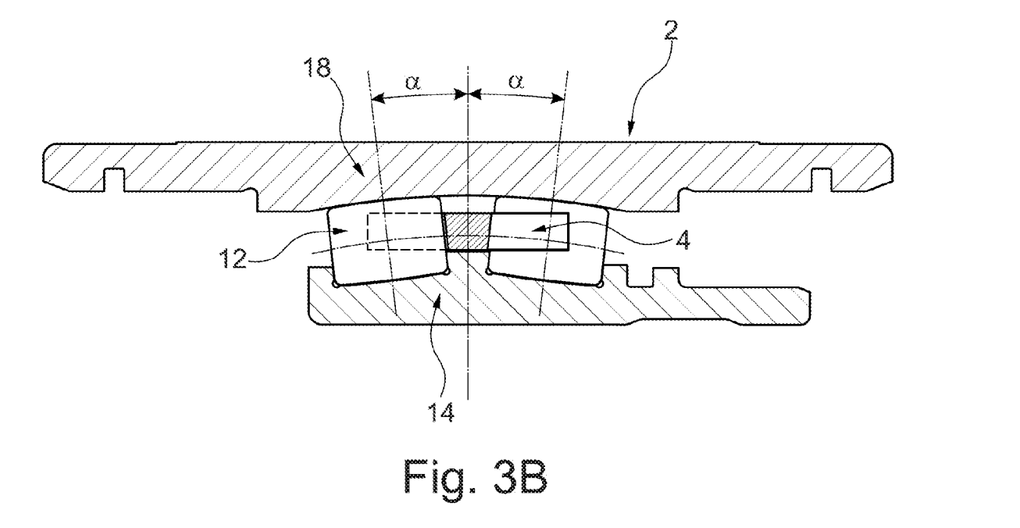
FIG. 3B is a side cross section view of a double row roller bearing assembly including the cage of FIGS. 1-3A.

As shown in FIG. 3A, an angle ($\theta$) is defined by the first partial cylindrical guide surface 40 relative to a rotational axis (X) of the double row roller bearing assembly 2. This angle ($\theta$) is equal to a nominal bearing contact angle ($\alpha$), illustrated in FIG. 3B, and is identical for both rows of rollers 12. The angle ($\theta$) is only shown with respect to the first partial cylindrical guide surface 40 in FIG. 3A, but the angle ($\theta$) is identical for both the first and second partial cylindrical guide surfaces 40, 140. The angle ($\theta$) for a cylindrical, double row roller bearing is equal to zero. The angle ($\theta$) for a spherical roller bearing is equal to a nominal contact angle of each row and is typically between 5° and 15°. The exact value for the angle ($\theta$) ultimately depends on internal geometry and a size of the bearing, and is driven by required characteristics.

Figure 6A:
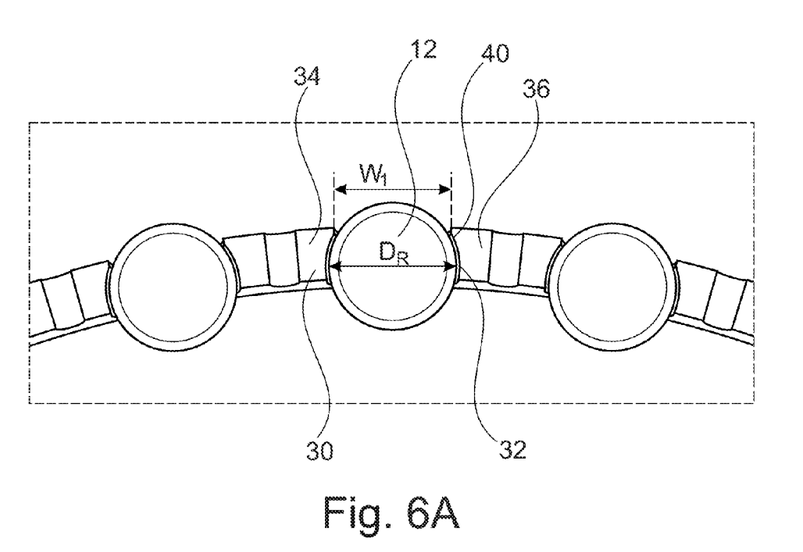
FIG. 6A is a side view of the cage and rollers of the double row roller bearing assembly of FIGS. 4 and 5 on a side of a first plurality of webs.
Figure 6B:
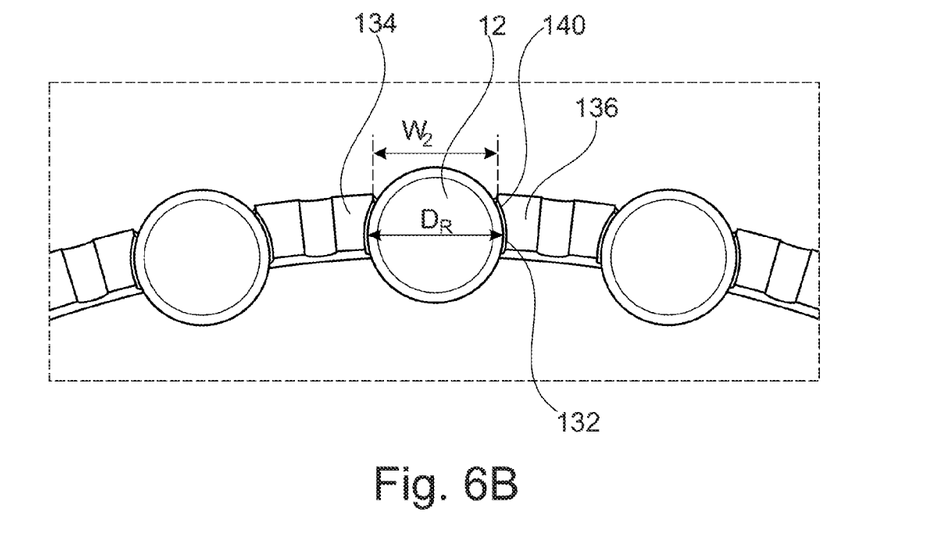
FIG. 6B is a side view of the cage and rollers of the double row roller bearing assembly of FIGS. 4, 5, and 6A on a side of a second plurality of webs.

Referring to FIG. 6A, a first circumferential window ($W_1$) is defined by the first partial cylindrical guide surfaces 40 of two of the first prongs 34, 36 on adjacent ones of the first plurality of webs 30 that define one of the first plurality of pockets 32. The first circumferential window ($W_1$) is preferably 80-90% of a diameter ($D_R$) of the first plurality of rollers 12. Referring to FIG. 6B, a second circumferential window ($W_2$) is defined by the second partial cylindrical guide surfaces 140 of two of the second prongs 134, 136 on adjacent ones of the second plurality of webs 130 that define one of the second plurality of pockets 132. The second circumferential window ($W_2$) is preferably 80-90% of the diameter ($D_R$) of the second plurality of rollers 12. The circumferential windows ($W_1$, $W_2$) can be identical if the first and second pluralities of rollers 12 are identical. The circumferential windows ($W_1$, $W_2$) are smaller than the diameter ($D_R$) of the plurality of rollers 12 such that the prongs 34, 36, 134, 136 must be deformed to snap the rollers 12 into the pockets 32, 132.

Figure 7A:
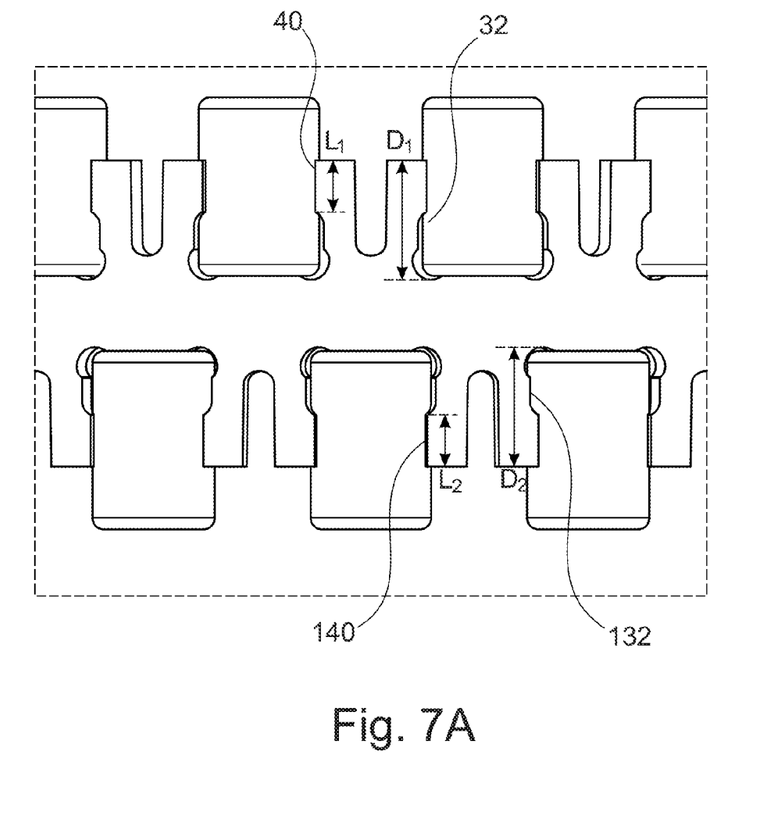
FIG. 7A is a top view of the cage and rollers of the double row roller bearing assembly of FIGS. 4, 5, 6A, and 6B illustrating a first set of dimensions.
Figure 7B:
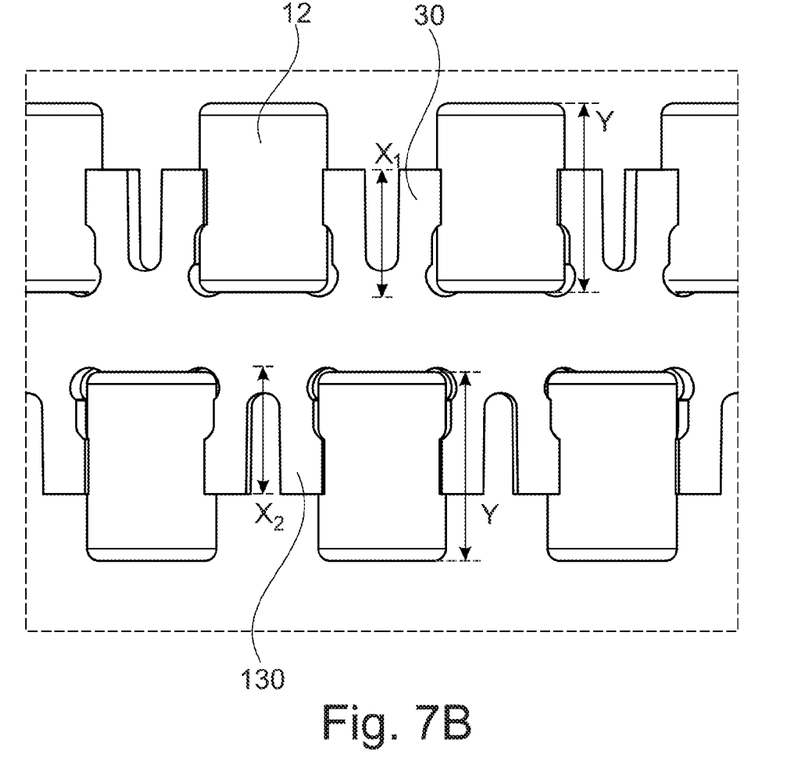
FIG. 7B is a top view of the cage and rollers of the double row roller bearing assembly of FIGS. 4, 5, 6A, 6B, and 7A illustrating a second set of dimensions.

As shown in FIG. 7A, the first plurality of partial cylindrical guide surfaces 40 and the second plurality of partial cylindrical guide surfaces 140 each have an axial length ($L_1$, $L_2$) that is preferably between 40-60% of an axial depth ($D_1$, $D_2$) of the first plurality of roller pockets 32 and the second plurality of roller pockets 132. In one embodiment, the first plurality of partial cylindrical guide surfaces 40 and the second plurality of partial cylindrical guide surfaces 140 each have an axial length ($L_1$, $L_2$) that is approximately 50% of the axial depth ($D_1$, $D_2$) of the first plurality of roller pockets 32 and the second plurality of roller pockets 132. Referring to FIG. 7B, the first plurality of webs 30 and the second plurality of webs 130 each have an axial extension ($X_1$, $X_2$) between 70-80% of an axial length (Y) of the plurality of rollers 12.

It is to be appreciated and will be apparent to those skilled in the art that many physical changes, only a few of which are exemplified in the detailed description, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the application being indicated by the appended claims rather than by the foregoing description, and all alternate embodiments and changes to this embodiment which come within the meaning and range of equivalency of said claims are therefore to be embraced therein.

LIST OF REFERENCES double row roller bearing assembly 2
cage 4
annular rim 6
first axial side 8
second axial side 10
plurality of rollers 12
curved axial ends 13
inner ring 14
first inner raceway 16a
second inner raceway 16b
outer ring 18
first outer raceway 20a
second outer raceway 20b
first plurality of webs 30
first plurality of roller pockets 32
two first prongs 34, 36
first slot 38
first partial cylindrical guide surface 40
first lateral surface 42
first plurality of undercuts 44
central rib 50
first shoulder 52
second shoulder 54
second plurality of webs 130
second plurality of roller pockets 132
two second prongs 134, 136
second slot 138
second partial cylindrical guide surface 140
second lateral surface 142
second undercut 144
axial length ($L_1$, $L_2$) of partial cylindrical guide surfaces
axial depth ($D_1$, $D_2$) of roller pockets
first circumferential window ($W_1$)
second circumferential window ($W_2$)
axial extension ($X_1$, $X_2$) of webs
axial length (Y) of roller
diameter ($D_R$) of roller
angle (θ) of partial cylindrical guide surfaces

What is claimed is:

1. A cage for a double row roller bearing assembly, the cage comprising:

an annular rim;

a first plurality of webs extending axially from a first axial side of the annular rim, a first plurality of roller pockets defined between adjacent ones of the first plurality of webs, each of the webs of the first plurality of webs includes two first prongs and a first slot defined between the two first prongs, the first slot defining a through opening in a radial direction between the two first prongs, a first partial cylindrical guide surface arranged on each first lateral surface of the first plurality of webs, and a first undercut defined between each of the first lateral surfaces and the annular rim, two of the first prongs on adjacent ones of the first plurality of webs that define one of the first plurality of roller pockets being elastically deformable away from one another for insertion of a roller; and a second plurality of webs extending axially from a second axial side of the annular rim, a second plurality of roller pockets defined between adjacent ones of the second plurality of webs, each of the webs of the second plurality of webs includes two second prongs and a second slot defined between the two second prongs, the second slot defining a through opening in the radial direction between the two second prongs, a second partial cylindrical guide surface arranged on each second lateral surface of the second plurality of webs, and a second undercut defined between each of the second lateral surfaces and the annular rim, two of the second prongs on adjacent ones of the second plurality of webs that define one of the second plurality of roller pockets being elastically deformable away from one another for insertion of a roller.

2. The cage according to claim 1, wherein the first plurality of webs and the second plurality of webs are circumferentially offset from each other.

3. The cage according to claim 2, wherein the first plurality of webs and the second plurality of webs are circumferentially offset from each other by half of a pitch of the first plurality of roller pockets and the second plurality of roller pockets.

4. The cage according to claim 1, wherein the first plurality of partial cylindrical guide surfaces and the second plurality of partial cylindrical guide surfaces are each spaced away from the annular rim.

5. The cage according to claim 1, wherein the first plurality of partial cylindrical guide surfaces are spaced away from the first plurality of undercuts, and the second plurality of partial cylindrical guide surfaces are spaced away from the second plurality of undercuts.

6. The cage according to claim 1, wherein the first plurality of partial cylindrical guide surfaces and the second plurality of partial cylindrical guide surfaces each have an axial length between 40-60% of an axial depth of the first plurality of roller pockets and the second plurality of roller pockets.

7. The cage according to claim 6, wherein the axial length of the first plurality of partial cylindrical guide surfaces and the second plurality of partial cylindrical guide surfaces is 50% of the axial depth of the first plurality of roller pockets and the second plurality of roller pockets.

8. The cage according to claim 1, wherein the cage is formed from glass-filled thermoplastic, carbon fiber, or polyamide-imide.

9. A bearing assembly comprising:
a cage according to claim 1;
an inner ring defining a first inner raceway and a second inner raceway;
an outer ring defining a first outer raceway and a second outer raceway; and
a first plurality of rollers runs on the first inner raceway and the first outer raceway, and a second plurality of rollers runs on the second inner raceway and the second outer raceway,
the first plurality of rollers arranged within the first plurality of roller pockets, and the second plurality of rollers arranged within the second plurality of roller pockets of the cage in an assembled state.

10. The bearing assembly according to claim 9, wherein an angle defined by the first partial cylindrical guide surface and the second partial cylindrical guide surface relative to a rotational axis of the bearing assembly is equal to a nominal contact angle of each row of the bearing assembly.

11. The bearing assembly of claim 9, further comprising a first circumferential window defined by the first partial cylindrical guide surfaces of two of the first prongs on adjacent ones of the first plurality of webs that define one of the first plurality of pockets, and the first circumferential window is 80-90% of a diameter of the plurality of rollers.

12. The bearing assembly of claim 9, further comprising a second circumferential window defined by the second partial cylindrical guide surfaces of two of the second prongs on adjacent ones of the second plurality of webs that define one of the second plurality of pockets, and the second circumferential window is 80-90% of a diameter of the plurality of rollers.

13. The bearing assembly of claim 9, wherein the plurality of rollers are cylindrical rollers with curved axial ends.

14. The bearing assembly of claim 9, wherein the first plurality of webs and the second plurality of webs each have an axial extension between 70-80% of an axial length of the plurality of rollers.

15. A bearing assembly comprising:
a cage including (1) an annular rim; (2) a first plurality of webs extending axially from a first axial side of the annular rim, a first plurality of roller pockets defined between adjacent ones of the first plurality of webs, each of the webs of the first plurality of webs includes two first prongs and a first slot defined between the two first prongs, a first partial cylindrical guide surface arranged on each first lateral surface of the first plurality of webs, and a first undercut defined between each of the first lateral surfaces and the annular rim, two of the first prongs on adjacent ones of the first plurality of webs that define one of the first plurality of roller pockets being elastically deformable away from one another for insertion of a roller; and (3) a second plurality of webs extending axially from a second axial side of the annular rim, a second plurality of roller pockets defined between adjacent ones of the second plurality of webs, each of the webs of the second plurality of webs includes two second prongs and a second slot defined between the two second prongs, a second partial cylindrical guide surface arranged on each second lateral surface of the second plurality of webs, and a second undercut defined between each of the second lateral surfaces and the annular rim, two of the second prongs on adjacent ones of the second plurality of webs that define one of the second plurality of roller pockets being elastically deformable away from one another for insertion of a roller;

an inner ring defining a first inner raceway and a second inner raceway;

an outer ring defining a first outer raceway and a second outer raceway; and a first plurality of rollers runs on the first inner raceway and the first outer raceway, and a second plurality of rollers runs on the second inner raceway and the second outer raceway, the first plurality of rollers arranged within the first plurality of roller pockets, and the second plurality of rollers arranged within the second plurality of roller pockets of the cage in an assembled state, wherein the plurality of rollers are arranged within the first plurality of roller pockets and the second plurality of roller pockets in the assembled state such that the two first prongs of each of the first plurality of webs are circumferentially deflected towards one another by adjacent ones of the first plurality of rollers, and the two second prongs of each of the second plurality of webs are circumferentially deflected towards one another by adjacent ones of the second plurality of rollers.

* * * * *